United States Patent [19]

Michaelis

[11] Patent Number: 5,682,268
[45] Date of Patent: Oct. 28, 1997

[54] GAS LENS

[76] Inventor: Maximillian Michaelis, Rycote Park, Milton Common, Oxfordshire, England, OX9 2PE

[21] Appl. No.: 500,975
[22] PCT Filed: Dec. 20, 1993
[86] PCT No.: PCT/GB93/02621
§ 371 Date: Aug. 8, 1995
§ 102(e) Date: Aug. 8, 1995
[87] PCT Pub. No.: WO94/15230
PCT Pub. Date: Jul. 7, 1994

[30] Foreign Application Priority Data

Dec. 18, 1992 [GB] United Kingdom ............ 92/9798

[51] Int. Cl.$^6$ .................................................. G02B 3/14
[52] U.S. Cl. ........................................ 359/667; 359/666
[58] Field of Search ................................. 359/667, 666

[56] References Cited

U.S. PATENT DOCUMENTS 5,067,801  11/1991  Mirels et al. ........................ 359/667

OTHER PUBLICATIONS

Iga et al, "Experimental Studies on the limitation of focussing power of hyperbolic-type gas lens", Japanese Journal of Applied Physics, vol. 8, No. 2, Feb. 69, p. 255.

Martynenko et al, "Thermo-gasdynamic control in laser beam guidance", Revue De Physique Appliquee, vol. 13, No. 7, Jul. 78, p. 329.

Primary Examiner—Michael J. Tokar
Assistant Examiner—Richard Hanig
Attorney, Agent, or Firm—William R. Hinds

[57] ABSTRACT

A colliding shock wave lens consists of a set of spark gaps capable of generating a number of shock waves in a gaseous medium which coalesce at the centre of the device, forming a region of transitory high density gas. This region of high density acts as a converging lens, momentarily capable of focusing a pulsed laser beam, timed to pass through the lens at the right instant. The lens may be used to modulate a laser beam or to Q-switch a laser.

5 Claims, 1 Drawing Sheet

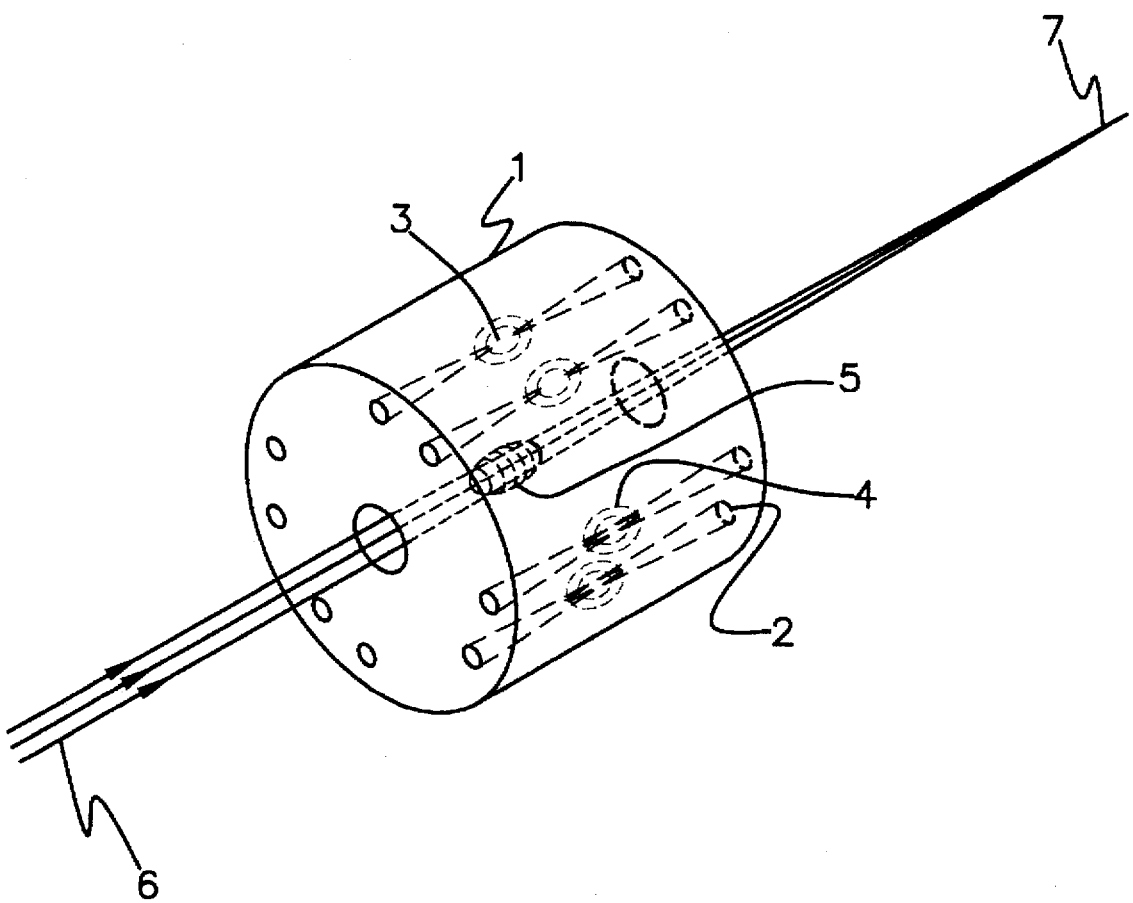

GAS LENS

The present invention relates to the focusing of beams of electromagnetic radiation, and, in particular to the focusing of beams of laser radiation by a lens formed by colliding shock waves in a gaseous medium.

Much attention is being paid at present to the development of high power lasers and to optics capable of focusing the beams of radiation that they produce. These focused beams are useful both in industry and research for such purposes as the drilling, cutting and welding of materials. The focusing is usually accomplished with solid lenses made of material appropriately transparent to the particular type of radiation emitted by the laser. Infra red beams may be focused with lenses made from such expensive materials as zinc-selenite or germanium. Visible beams may be focused with ordinary glass lenses and ultraviolet beams with quartz lenses. All three types of radiation also may be focused with gas lenses that use hot and cold air or gas to refract the radiation. Such optical systems are not entirely satisfactory for at least two reasons. Firstly, the solid lenses are delicate and need to operate in clean room conditions, which are not normally available or practical in industrial environments. Moreover, the amount of radiation they can transmit and focus is limited; high power laser beams frequently interact explosively with solid optical components. Secondly, gas lenses although able to focus large amounts of radiation are very weak lenses and tend to be heavy and bulky. For example, French patent 2 410 293 discloses various arrangements for producing density waves in the atmosphere to focus solar radiation and Martynenko et al in Revue de Physique Appliques Vol 13, No. 7 July 1978 disclose a number of arrangements of gas lenses formed by thermal density gradients produced in a gaseous medium by various arrangements of heated and cooled pipes. However, none of these arrangements disclosed in either of these documents is capable of producing anything other than a weak focusing action.

Most research and industrial applications require strong lenses, that is to say, with short focal lengths. They must also be light and compact.

It is an object of the present invention to provide a gas lens which is compact and capable of focusing strongly intense beams of electromagnetic radiation.

According to the present invention there is provided a method of focusing a beam of electromagnetic radiation, comprising the operation of generating in the path of the beam of electromagnetic radiation a localised region of high density in a gaseous medium which is transparent to the beam of electromagnetic radiation and has a symmetrical density profile with respect to the optical axis of the beam of electromagnetic radiation such as to bring the beam of electromagnetic radiation to a focus.

Also according to the invention there is provided an apparatus for focusing a beam of electromagnetic radiation, comprising at least three spark gaps, as herein defined, symmetrically disposed about a region of space through which a beam of electromagnetic radiation to be focused can be caused to pass such that shock waves produced by electric discharges in a gaseous medium at the spark gaps interact to form a localised region of high pressure in the gaseous medium centred on the optical axis of the beam of electromagnetic radiation and having a density profile such as to bring the beam of electromagnetic radiation to a focus.

Preferably the spark gaps are located inside a cylindrical chamber which confines the shock waves and also the gas if this be different from air. The chamber is provided with two co-axial apertures to allow passage of the electromagnetic radiation.

It should be noted that the term spark gap is used to denote a pair of electrodes between which an electrical discharge can be made to occur.

The means for generating the central high density may comprise electronic means for generating a plurality of sparks synchronously and at points equally spaced around the circumference of the circle.

The means for generating the sparks may comprise two annular opposing sets of sharpened points or needles forming millimetric gaps across which a voltage of several thousand volts is applied to generate the sparks.

Suitable gases to form the lens are air, carbon dioxide, or mixtures or vapours with higher refractive indices than air.

BRIEF DESCRIPTION OF THE DRAWINGS

An embodiment of the invention will now be described, by way of example, with reference to the accompanying drawing.

DETAILED DESCRIPTION OF THE INVENTION

Referring to the drawing, an apparatus for focusing a beam of electromagnetic radiation comprises a cylindrical chamber 1 made of insulating material, the internal diameter of the chamber being 6 cm and the internal separation of its flat walls 1 cm. Within the chamber 1 are located sixteen needles 2 opposing each other two by two to form eight regularly spaced spark gaps 3 located on the circumference of a circle of diameter 5 cm. The needles 2 are connected to a suitable high voltage power supply not shown in the drawing capable of providing a pulse of about 50 joules in less than one microsecond at an output voltage of up to twenty kilovolts. The eight spark gaps 3 are electrically connected in series to ensure simultaneous breakdown.

The sparks generated between the spark gaps 4 produce shock waves that converge on the centre of the circle about which they are disposed where they generate a region of high density air or gas, which acts as a transitory gas lens 5. A pulsed beam of electromagnetic radiation 6 traversing the lens 5 at the right time and aligned along the axis, is brought to a sharp focus 7.

If the beam of electromagnetic radiation 6 is continuous rather than pulsed, then the apparatus can be used to pulse-modulate the beam of electromagnetic radiation 6, if the lens 5 is placed inside a laser cavity, it can be used to enhance the power of the laser through a process known as Q-switching.

I claim:

1. An apparatus for focusing a beam of electromagnetic radiation, wherein there is provided a cylindrical chamber having axial entrance and exit windows for a beam of electromagnetic radiation to be brought to a focus, and means for producing simultaneously in a gaseous medium contained in the chamber a plurality of electrical discharges regularly disposed about the axis of the chamber, shock waves from which are constrained by the cylindrical chamber and interact to produce a transitory lens adapted to bring the beam of radiation to the focus.

2. Apparatus according to claim 1 wherein the means for producing the electric discharges comprises a plurality of pairs of opposed electrodes.

3. Apparatus according to claim 1 wherein there is included means for admitting the gaseous medium to the chamber.

4. Apparatus according to claim 1 wherein there is included means for circulating the gaseous medium through the cylindrical chamber.

5. Apparatus according to claim 2 wherein there is included means for producing electrical pulses having voltages. of up to 20 kilovolts, energies of about 50 joules and durations of less than a microsecond and applying the said electrical pulses simultaneously to the pairs of opposed electrodes.

* * * * *